(12) United States Patent
Matsumoto et al.

(10) Patent No.: US 10,483,512 B2
(45) Date of Patent: Nov. 19, 2019

(54) BATTERY PACK

(71) Applicant: TOYOTA JIDOSHA KABUSHIKI KAISHA, Toyota-shi, Aichi-ken (JP)

(72) Inventors: Mizuho Matsumoto, Toyota (JP); Tomohiro Matsuura, Toyota (JP); Satomi Yamamoto, Miyoshi (JP); Takashi Takimoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/847,223

(22) Filed: Dec. 19, 2017

(65) Prior Publication Data
US 2018/0183026 A1 Jun. 28, 2018

(30) Foreign Application Priority Data
Dec. 26, 2016 (JP) .................. 2016-251810

(51) Int. Cl.
*H01M 2/12* (2006.01)
*H01M 2/10* (2006.01)

(52) U.S. Cl.
CPC .......... *H01M 2/12* (2013.01); *H01M 2/1077* (2013.01); *H01M 2/1241* (2013.01); *H01M 2220/20* (2013.01)

(58) Field of Classification Search
CPC ..... H01M 2/12; H01M 2/1077; H01M 2/1241
See application file for complete search history.

(56) References Cited

U.S. PATENT DOCUMENTS

2014/0295220 A1* 10/2014 Mori ............ H01M 2/12
429/53

FOREIGN PATENT DOCUMENTS

| JP | 61-179058 A | 8/1986 | |
| JP | 2011-249107 A | 12/2011 | |
| JP | 2012-64447 A | 3/2012 | |
| JP | 5966457 B2 | 7/2016 | |
| JP | 5966457 B2 * | 8/2016 | ............ H01M 10/52 |

* cited by examiner

*Primary Examiner* — Jimmy Vo
(74) *Attorney, Agent, or Firm* — Sughrue Mion, PLLC

(57) ABSTRACT

A battery pack is a battery pack that is configured by arranging plural chargeable-dischargeable single cells in a specified direction. Each of the plural single cells includes: an electrode body including a positive electrode and a negative electrode; and a box-shaped battery case accommodating the electrode body and an electrolyte. The two adjacent single cells in the battery pack are provided with gas discharge valves in mutually opposing surfaces of the battery cases, each of the gas discharge valves discharging gas that is produced in the battery case. In the battery cases provided in the two adjacent single cells, the gas discharge valves that are provided in the mutually opposing surfaces are disposed at positions that do not overlap each other when seen in an arrangement direction of the single cells.

4 Claims, 6 Drawing Sheets ously dipe# BATTERY PACK

INCORPORATION BY REFERENCE

The disclosure of Japanese Patent Application No. 2016-251810 filed on Dec. 26, 2016 including the specification, drawings and abstract is incorporated herein by reference in its entirety.

BACKGROUND

1. Technical Field

The disclosure relates to a battery pack.

2. Description of Related Art

One of power storage elements such as a lithium-ion secondary battery, a nickel-metal hydride battery, another type of a secondary battery, and a capacitor, each of which is lightweight and has high energy density, is selected as a single cell, and the plural single cells are connected in series to form a battery pack. Being a power supply with high output, such a battery pack is preferably used as an in-vehicle power supply or a power supply for a personal computer and a portable terminal. One example of the battery pack is disclosed in Japanese Patent No. 05966457 (JP 05966457 B). The battery pack is configured by arranging plural units of square-shaped single cells and connecting positive-electrode terminals and negative-electrode terminals, each pair of which is provided in each of the single cells, in series. In such a battery pack, the plural single cells are reversely disposed such that the positive-electrode terminals and the negative-electrode terminals are alternately disposed. A gas discharge valve (a safety valve) is provided on an upper surface of a battery case in each of the single cells, so as to discharge gas that is produced in the battery during overcharging.

SUMMARY

In order to improve the energy density of each of the single cells, as shown in FIG. 11, the inventors have considered to increase dimensions of each single cell 1 in a lateral direction X and a vertical direction Y and reduce a dimension thereof in a thickness direction (an arrangement direction of each of the single cells at a time when the battery pack is formed) Z. However, when the single cell 1 is made low profile by reducing the dimension of the single cell 1 in the thickness direction Z, it is difficult to dispose the gas discharge valve on a lateral surface 2 of the battery case in dimension wise. In this case, there is no other way than to form the gas discharge valve on a wide surface (a surface of each of the battery cases on which the battery cases oppose each other at the time when the battery pack is formed) 3 of the battery case, and a formation position of the gas discharge valve is required to be a position at which the gas discharge valve has no negative effect on the gas discharge valve of the adjacent single cell and at which the gas discharge valve can efficiently discharge the gas produced in the battery case in a state where the battery pack is formed.

The disclosure provides a battery pack that is configured by arranging plural chargeable-dischargeable single cells in a specified direction and that can efficiently discharge gas from a gas discharge valve even when the gas discharge valve is formed on a wide surface of a battery case (a surface of each of the battery cases on which the battery cases oppose each other at a time when the battery pack is formed).

A battery pack provided by the disclosure is a battery pack that is configured by arranging plural chargeable-dischargeable single cells in a specified direction. Each of the plural single cells includes: an electrode body including a positive electrode and a negative electrode; and a box-shaped battery case accommodating the electrode body and an electrolyte. In the battery pack disclosed herein, the two adjacent single cells of the battery pack are provided with gas discharge valves in mutually opposing surfaces of the battery cases, each of the gas discharge valves discharging gas that is produced in the battery case. In the battery cases provided in the two adjacent single cells, the gas discharge valves that are provided in the mutually opposing surfaces are characterized to be disposed at positions that do not overlap each other when seen in an arrangement direction of the single cells.

In this specification, the "single cell" is a term that indicates each of power storage elements that are mutually connected in series to constitute the battery pack, and includes batteries and capacitors of various compositions unless otherwise particularly limited. A "secondary battery" refers to a general battery that can repeatedly be charged, and includes storage batteries such as a lithium-ion secondary battery and a nickel-metal hydride battery. The power storage element that constitutes the lithium-ion secondary battery is a typical example that is included in the "single cell" referred herein. A lithium-ion secondary battery module that is configured by including a plurality of such single cells is a typical example of the "battery pack" disclosed herein.

In the battery cases provided in the above-described adjacent single cells, the gas discharge valves, which are provided in the mutually opposing surfaces, each discharge the gas produced in the battery case when a pressure inside the battery case reaches a specified value, for example. In the case where such gas discharge valves are formed at positions that overlap each other when seen in the arrangement direction of the single cells, the gas that is discharged from the gas discharge valve of one of the adjacent single cells blown onto the gas discharge valve of the other of the adjacent single cells. As a result, the gas discharge valve of the other of the adjacent single cells possibly suffers from a negative effect. In addition, in the case where both of the gas discharge valves are actuated simultaneously, discharge of the gas from both of the gas discharge valves is mutually inhibited. As a result, there is a possibility that the gas produced in each of the battery cases cannot efficiently be discharged. Thus, such a case is not preferred. In the battery pack of the disclosure with the above configuration, the gas discharge valves, which are provided in the mutually opposing surfaces of the battery cases, are disposed at the positions that do not overlap each other when seen in the arrangement direction. Thus, the gas that is discharged from the gas discharge valve of one of the adjacent single cells is less likely to be blown onto the gas discharge valve of the other of the adjacent single cells. In addition, even in the case where both of the gas discharge valves are actuated simultaneously, the discharge of the gas is less likely to be mutually inhibited. Therefore, it is possible to provide the battery pack with this configuration that is less likely to cause inconvenience as described above and is high in reliability.

In the battery pack, a direction that is a perpendicular direction to a lateral direction and a vertical direction, each of which follows an outer shape of the single cell, may be the arrangement direction in which the single cells are arranged in the battery pack, and, in the lateral direction, the gas discharge valve may be disposed at a position that is offset from a center line of the battery case.

In the battery pack, in the lateral direction, length from a center of the gas discharge valve to the center line may be greater than length from the center of the gas discharge valve to an outer edge of the gas discharge valve.

In the battery pack, the length from the center of the gas discharge valve to the center line may be 1.5 times or more than the length from the center of the gas discharge valve to the outer edge of the gas discharge valve.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
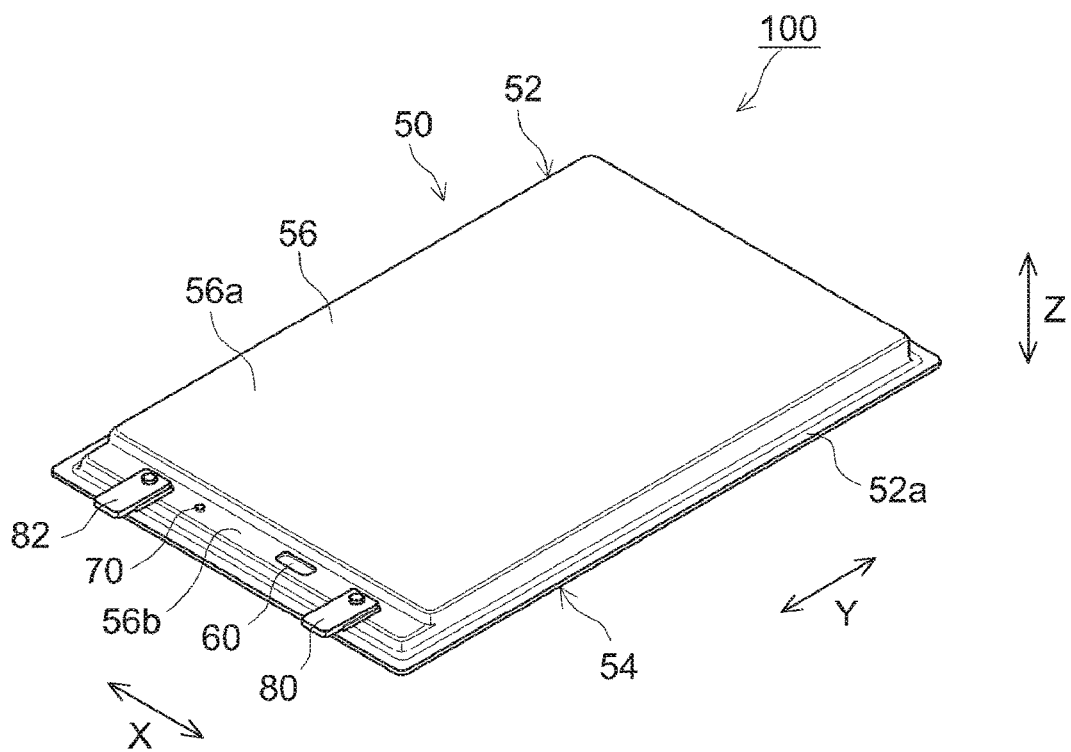
FIG. 1 is a perspective view, schematically illustrating a single cell according to one embodiment of the disclosure.

A description will hereinafter be made on an embodiment of the disclosure with reference to the drawings. Note that matters other than those specifically mentioned in this specification and matters required for implementation of the disclosure (for example, a general configuration and a general manufacturing process of an electrode body, neither of which characterizes the disclosure) can be acknowledged as design matters of a person skilled in the art that are based on the related art in this field. The disclosure can be implemented on the basis of contents disclosed in this specification and common general technical knowledge in this field. In addition, in the following drawings, members and portions that exert the same effects are denoted by the same reference numerals. Furthermore, dimensional relationships (length, width, thickness, and the like) in each of the drawings do not necessarily reflect actual dimensional relationships.

A chargeable-dischargeable secondary battery is preferably used as a single cell for a battery pack according to the disclosure, and the battery pack is preferably formed by connecting plural units of such single cells in series. A configuration of each of the single cells is not particularly limited. Each of a nickel-metal hydride battery, an electric double-layered capacitor, and the like is exemplified as the single cell that has a preferred configuration for the implementation of the disclosure. A lithium-ion secondary battery has a particularly preferred configuration of the single cell for the implementation of the disclosure. Because the lithium-ion secondary battery is a secondary battery with high energy density that can realize high output, a high-performance battery pack, in particular, a high-performance in-vehicle battery pack (battery module) can be constructed thereof. Although there is no intention of particularly limiting a battery configuration to that of the lithium-ion secondary battery, the disclosure will hereinafter be described in detail by using the lithium-ion secondary battery as an example of the battery configuration.

The battery pack is configured by arranging the plural chargeable-dischargeable single cells in a specified direction. Similar to the single cell that is equipped in the battery pack of the related art, each of the plural single cells typically includes: the electrode body that is equipped with specified battery constituent materials (an active material for each of positive/negative electrodes, a current collector for each of the positive/negative electrodes, a separator, an electrolyte, and the like); and a box-shaped battery case that accommodates the electrode body.

Figure 2:
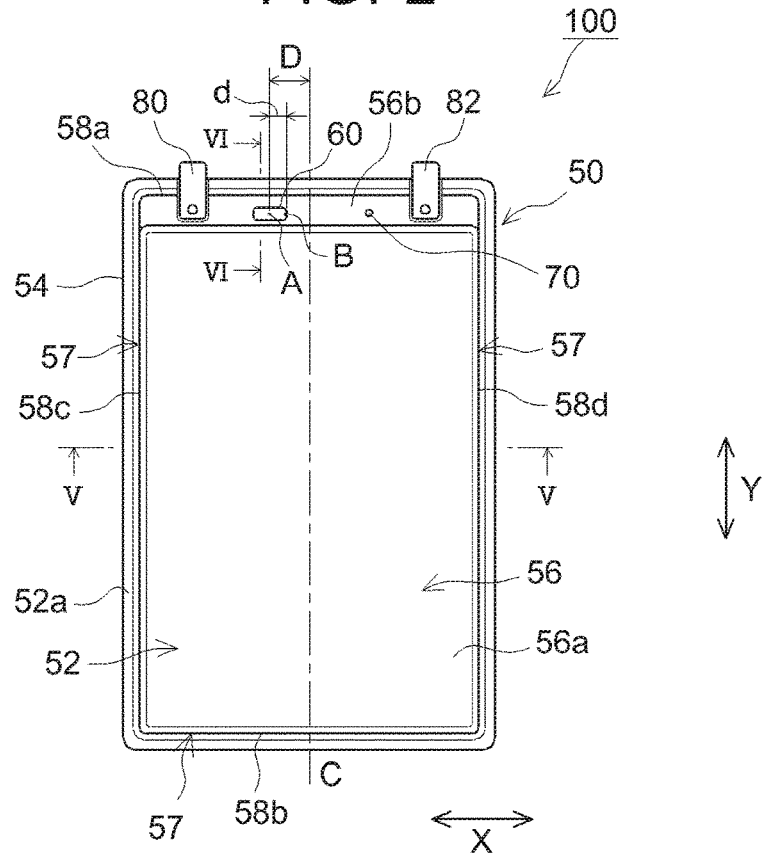
FIG. 2 is a plan view, schematically illustrating the single cell according to the embodiment of the disclosure.
Figure 3:
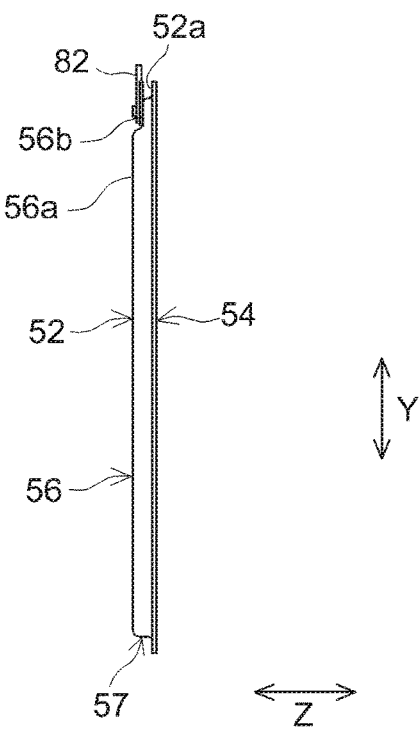
FIG. 3 is a side view, schematically illustrating the single cell according to the embodiment of the disclosure.
Figure 4:
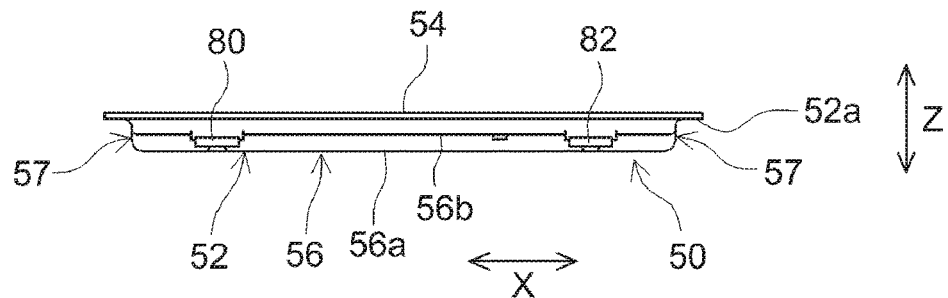
FIG. 4 is another side view, schematically illustrating the single cell according to the embodiment of the disclosure.
Figure 5:
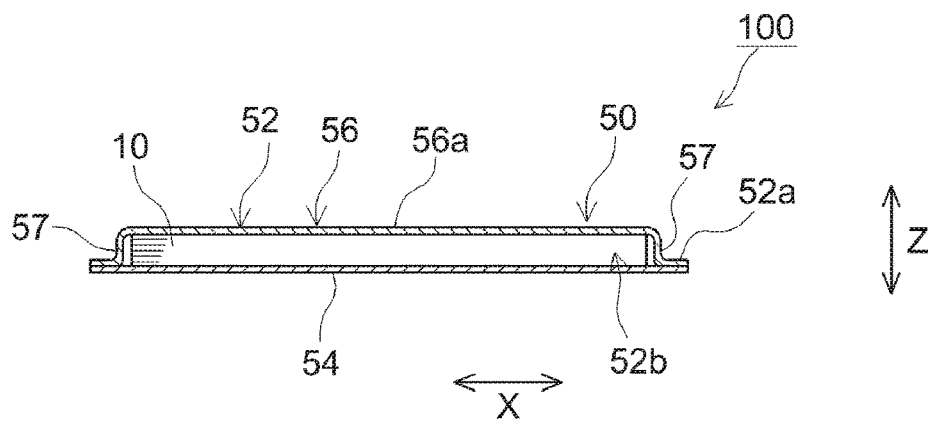
FIG. 5 is a cross-sectional view, taken along a line V-V in FIG. 2.
Figure 6:
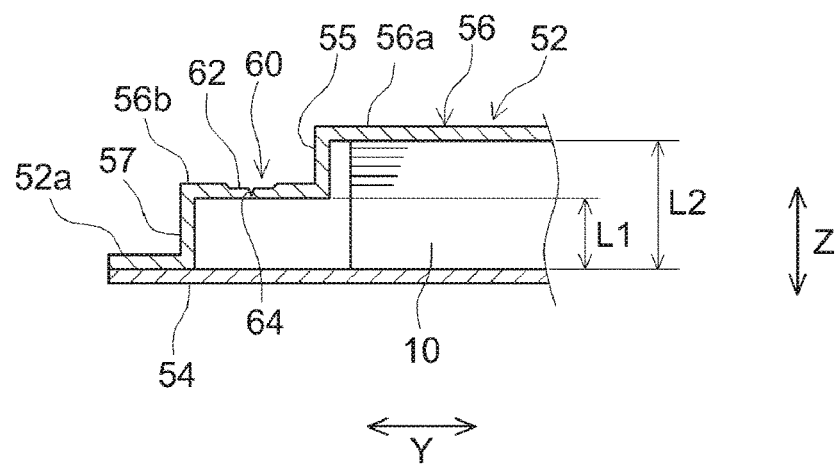
FIG. 6 is a cross-sectional view, taken along a line VI-VI in FIG. 2.
Figure 7:
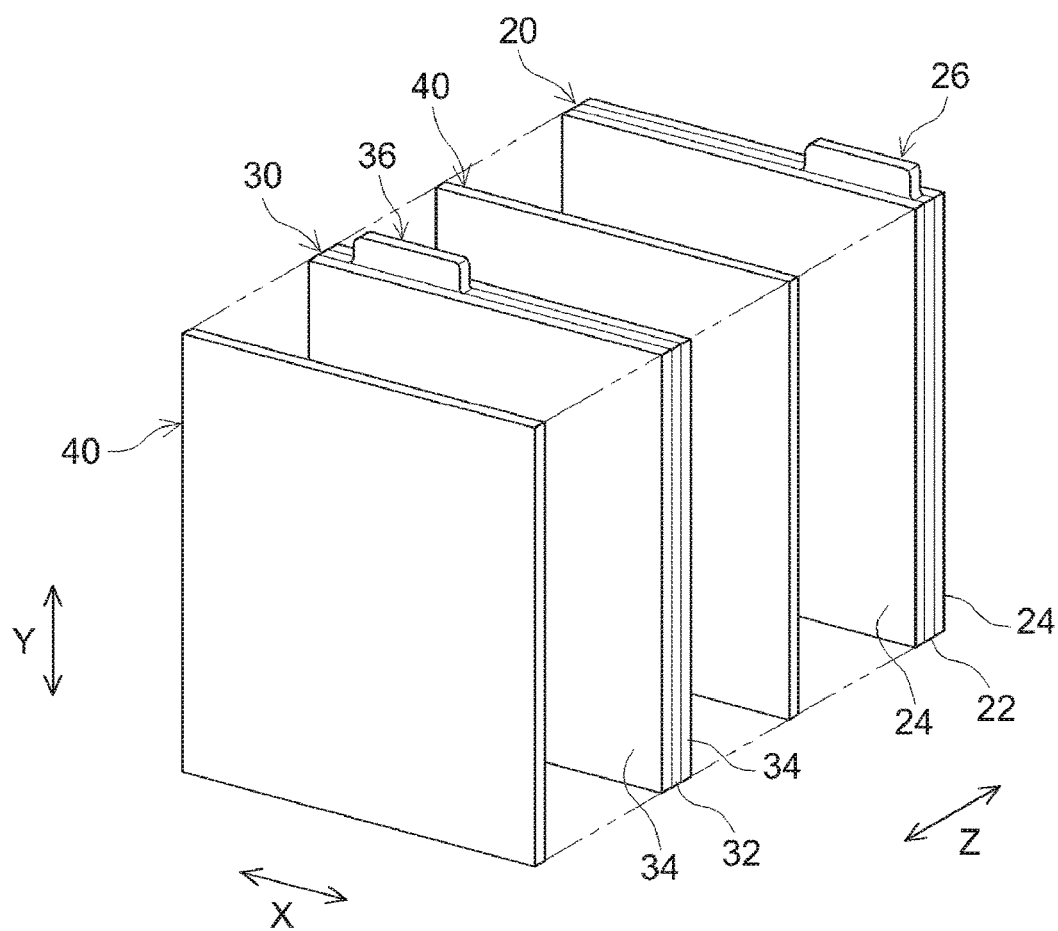
FIG. 7 is a view, illustrating a positive electrode, a negative electrode, and a separator that constitute an electrode body in each of the single cells.

FIG. 1 is a perspective view of a single cell (a lithium-ion secondary battery) 100 that constitutes the battery pack according to this embodiment, FIG. 2 is a plan view thereof, FIG. 3 is a side view thereof, FIG. 4 is another side view thereof, FIG. 5 is a cross-sectional schematic view that is taken along V-V in FIG. 2, and FIG. 6 is a cross-sectional schematic view that is taken along VI-VI in FIG. 2. FIG. 7 is a view that illustrates a positive electrode 20, a negative electrode 30, and a separator 40 that constitute an electrode body 10 in each of the single cells 100. In the following description, along an outer shape of the single cell 100, an X-direction, a Y-direction, and a Z-direction that is a perpendicular direction to the X-direction and the Y-direction are respectively referred to as a lateral direction, a vertical direction, and a thickness direction. Here, the thickness direction Z corresponds to a direction in which the single cells 100 are arranged in the battery pack (an arrangement direction). Note that these are merely directions defined for the purpose of convenience and thus do not limit an installation aspect of the lithium-ion secondary battery 100 in any respects.

As shown in FIG. 1 to FIG. 7, the lithium-ion secondary battery 100 includes a battery case 50, the electrode body 10, a gas discharge valve 60, an liquid injection hole 70, a positive electrode terminal 80, a negative electrode terminal 82, and the electrolyte, which is not shown.

The battery case 50 is a container that accommodates the electrode body 10 and the electrolyte. In this embodiment, the battery case 50 has a box-shaped outer shape (an angled rectangular parallelepiped shape). The battery case 50 includes an almost flat case body 52 and a sealing plate 54. The case body 52 is formed in a concave shape that can accommodate the electrode body 10. In the case body 52, of surfaces that constitute the case body 52, the surface with the largest area (a wide surface) is opened. In this embodiment, one of the surfaces of the case body 52 in the thickness direction Z is opened. The case body 52 also has a flange portion 52a that is attached to a peripheral edge of an opening portion 52b. The sealing plate 54 is a flat plateshaped member that closes the opening portion 52b of the case body 52. The sealing plate 54 is attached to the case body 52 in a manner to cover the opening portion 52b of the case body 52. The case body 52 and the sealing plate 54 are disposed to oppose each other in the thickness direction Z with the electrode body 10 being held therebetween. The flange portion 52a which is provided in the case body 52 and the sealing plate 54 are joined to each other by seal welding. In this way, the battery case 50 is tightly sealed. A material of the battery case 50 is a metallic material such as aluminum or steel. The battery case 50 can be set to have 0.3 mm or greater in thickness (wall thickness), for example, and can typically be set to have 0.3 mm to 1 mm in thickness.

The concave case body 52 has: a flat surface 56 on which the electrode body 10 is disposed; and a lateral wall surface 57 that is raised from the flat surface 56 so as to surround the electrode body 10 disposed on the flat surface 56. When seen in the thickness direction Z, the flat surface 56 has a rectangular shape that is defined by a first side 58a, a second side 58b that opposes the first side 58a, a third side 58c that is orthogonal to the first side 58a, and a fourth side 58d that is orthogonal to the first side 58a and opposes the third side 58c. The lateral wall surface 57 is formed along the four sides (the first side 58a, the second side 58b, the third side 58c, and the fourth side 58d) of the flat surface 56 so as to surround the electrode body 10, which is disposed on the flat surface 56.

The flat surface 56 is also formed in a step shape (an uneven shape) that includes: a wide portion 56a, a distance of which from the sealing plate 54 is long, and a narrow portion 56b, a distance of which from the sealing plate 54 is shorter than that of the wide portion 56a. The wide portion 56a of the flat surface 56 is a portion in which the electrode body 10 is disposed. The wide portion 56a of the flat surface 56 opposes the electrode body 10, which is accommodated in the battery case 50. A distance L2 (FIG. 6) between the wide portion 56a of the flat surface 56 and the sealing plate 54 is substantially the same as thickness of the electrode body 10 in the thickness direction Z. The distance L2 between the wide portion 56a of the flat surface 56 and the sealing plate 54 can be set to 3 mm to 20 mm, for example, and can typically be set to 5 mm to 15 mm. The narrow portion 56b of the flat surface 56 is connected to the wide portion 56a via a step 55 (FIG. 6). The narrow portion 56b of the flat surface 56 is a portion in which the gas discharge valve 60 is formed. The narrow portion 56b of the flat surface 56 does not oppose the electrode body 10, which is accommodated in the battery case 50. In this embodiment, the narrow portion 56b of the flat surface 56 is formed along one end side of the flat surface 56 (the first side 58a herein) in the vertical direction Y. When compared to the wide portion 56a, the narrow portion 56b of the flat surface 56 is formed to be projected to the sealing plate 54 side. A distance L1 (FIG. 6) between the narrow portion 56b of the flat surface 56 and the sealing plate 54 is shorter than the distance L2 between the wide portion 56a and the sealing plate 54 (L1<L2). The distance L1 between the narrow portion 56b and the sealing plate 54 is approximately 4/5 or shorter of the distance L2 between the wide portion 56a and the sealing plate 54 (that is, L1/L2≤0.8), and is preferably 3/5 or shorter thereof (that is, L1/L2≤0.6). Although a lower limit of L1/L2 is not particularly limited, for example, L1/L2≥0.3 can be realized, and L1/L2≥0.5 can typically be realized.

The gas discharge valve 60 is configured to discharge gas that is produced in the battery case 50 when a pressure inside the battery case 50 reaches a specified value. As shown in FIG. 2 and FIG. 6, the gas discharge valve 60 is disposed in the narrow portion 56b of the flat surface 56 of the case body 52. In addition, the gas discharge valve 60 is disposed at a position that is offset from a center line C of the battery case 50 (that is, an intermediate line of the flat surface 56 between the third side 58c and the fourth side 58d) to the third side 58c side in the lateral direction X. In this embodiment, in the lateral direction X, length D from a center A of the gas discharge valve 60 to the above center line C is greater than length d from the center A of the gas discharge valve 60 to an outer edge B of the gas discharge valve 60 (that is, D>d). For example, the length D from the center A of the gas discharge valve 60 to the center line C is preferably 1.5 times or more than the length d from the center A of the gas discharge valve 60 to the outer edge B of the gas discharge valve 60 (that is, D/d≥1.5), and is further preferably twice or more than the length d from the center A of the gas discharge valve 60 to the outer edge B of the gas discharge valve 60 (that is, D/d≥2). Although an upper limit of D/d is not particularly limited, for example, the upper limit of D/d can be set to satisfy D/d≤4 (typically D/d≤3). The length d from the center A of the gas discharge valve 60 to the outer edge B of the gas discharge valve 60 can be 3 mm to 15 mm, for example, and can typically be 5 mm to 10 mm.

The configuration of the gas discharge valve 60 itself is not particularly limited as long as the gas discharge valve 60 can discharge the gas, which is produced in the battery case 50, when the pressure inside the battery case 50 reaches the specified value. For example, as shown in FIG. 6, the gas discharge valve 60 can have such a structure that a thin portion 62 is provided in a portion (the narrow portion 56b of the flat surface 56 herein) of the battery case 50. A notched groove 64 may be formed in the thin portion 62. In this case, when the pressure inside the battery case 50 reaches the specified value, the thin portion 62 is fractured. In this way, the gas, which is produced in the battery, can be discharged to the outside of the battery through the gas discharge valve 60. Alternatively, the gas discharge valve 60 may include a valve body that is fractured at a time when the pressure inside the battery case 50 reaches the specified value. In this case, when the pressure inside the battery case 50 reaches the specified value, the valve body is fractured. In this way, the gas, which is produced in the battery, can be discharged to the outside of the battery through the gas discharge valve 60.

As shown in FIG. 1 to FIG. 6, similar to the above-described gas discharge valve 60, the positive electrode terminal 80 and the negative electrode terminal 82 are disposed in the narrow portion 56b of the flat surface 56 of the case body 52. The positive electrode terminal 80 is electrically connected to the positive electrode 20 of the electrode body 10. The negative electrode terminal 82 is electrically connected to the negative electrode 30 of the electrode body 10. In the lateral direction X, the positive electrode terminal 80 and the negative electrode terminal 82 are disposed line-symmetrically about the center line C of the battery case 50. The positive electrode terminal 80 is disposed on the third side 58c side from the center line C. The negative electrode terminal 82 is disposed on the fourth side 58d side from the center line C. The liquid injection hole 70 is also provided in the narrow portion 56b of the flat surface 56 of the case body 52. In the narrow portion 56b of the flat surface 56, the liquid injection hole 70 is disposed at a position that is offset to the fourth side 58d side from the above center line C. The liquid injection hole 70 is used to inject the liquid electrolyte (an electrolytic solution) there-from. A cap is attached to the liquid injection hole 70, and the liquid injection hole 70 is sealed in an airtight manner.

The electrode body 10 and the electrolyte are accommodated in the battery case 50. As shown in FIG. 7, the electrode body 10 is the electrode body of a laminated type (a laminated electrode body) herein. The electrode body 10 includes plural rectangular positive electrode sheets 20 and plural rectangular negative electrode sheets 30. The positive electrode sheets 20 and the negative electrode sheets 30 are laminated in insulated states via the separator 40. A lamination direction of the electrode body 10 is the thickness direction Z herein.

The positive electrode sheet 20 includes a positive-electrode current collector 22 and a positive-electrode active material layer 24 that is formed on each surface of the positive-electrode current collector 22. For example, metal foil that is suited for the positive electrode can preferably be used as the positive-electrode current collector 22. In this embodiment, aluminum foil is used as the positive-electrode current collector 22. In the illustrated example, the positive-electrode active material layers 24 are respectively supported on both of the surfaces of the positive-electrode current collector 22. In addition, in the lateral direction X and the vertical direction Y, the positive-electrode active material layer 24 is formed to have the same width as total width of the positive-electrode current collector 22.

The positive-electrode active material layer 24 contains a positive-electrode active material, a conductive material, and a binder. One type or two or more types of materials that are used as the lithium-ion secondary battery in the related art can be used for the positive-electrode active material without any particular limitation. As one example, a lithium-transition metal composite oxide with a layer structure that can be expressed by a general expression $LiMeO_2$ (Me contains at least one type of transition metal elements such as Ni, Co, and Mn) is used, and examples of such a lithium-transition metal composite oxide are $LiNi_{1/3}Co_{1/3}Mn_{1/3}O_2$ (a lithium-nickel-cobalt-manganese composite oxide), $LiNiO_2$ (a lithium-nickel composite oxide), and $LiCoO_2$ (a lithium-cobalt composite oxide). In addition to the positive-electrode active material described above, the positive-electrode active material layer 24 can contain the conductive material such as acetylene black (AB) and the binder such as polyvinylidene fluoride (PVDF) or styrene-butadiene rubber (SBR).

The positive electrode sheet 20 has a projected portion 26 that is not formed with the positive-electrode active material layer 24 and is projected outward from a portion of the positive electrode sheet 20 that is formed with the positive-electrode active material layer 24. Because the positive-electrode active material layer 24 is not formed in this projected portion 26, the positive-electrode current collector 22 is exposed in the projected portion 26. A positive-electrode current collection tab 26 is formed by this projected portion 26. The positive-electrode current collection tab 26 extends outward from an end of the positive-electrode active material layer 24.

The negative electrode sheet 30 includes a negative-electrode current collector 32 and a negative-electrode active material layer 34 that is formed on each surface of the negative-electrode current collector 32. For example, metal foil that is suited for the negative electrode can preferably be used as the negative-electrode current collector 32. In this embodiment, copper foil is used as the negative-electrode current collector 32. In the illustrated example, the negative-electrode active material layers 34 are respectively supported on both of the surfaces of the negative-electrode current collector 32. In addition, in the lateral direction X and the vertical direction Y, the negative-electrode active material layer 34 is formed to have the same width as total width of the negative-electrode current collector 32.

The negative-electrode active material layer 34 contains a negative-electrode active material, a thickener, the binder, and the like. One type or two or more types of the materials that are used for the lithium-ion secondary battery in the related art can be used as the negative-electrode active material without any particular limitation. Examples of the negative-electrode active material are carbon-based materials such as graphite carbon and amorphous carbon, the lithium-transition metal composite oxide, and a lithium-transition metal nitride. In addition to such a negative-electrode active material, the binder such as polyvinylidene fluoride (PVDF) or styrene-butadiene rubber (SBR) and the thickener such as carboxymethyl cellulose (CMC) can be added to the negative-electrode active material layer 34.

The negative electrode sheet 30 has a projected portion 36 that is not formed with the negative-electrode active material layer 34 and is projected outward from a portion of the negative electrode sheet 30 that is formed with the negative-electrode active material layer 34. Because the negative-electrode active material layer 34 is not formed in this projected portion 36, the negative-electrode current collector 32 is exposed in the projected portion 36. A negative-electrode current collection tab 36 is formed by this projected portion 36.

The separator 40 is a member that separates the positive electrode sheet 20 and the negative electrode sheet 30 from each other. In this example, the separator 40 is formed of a sheet material that has plural minute holes and specified width. For example, either one of a separator with a single-layer structure and a separator with a laminated structure, each of which is formed from a porous polyolefin resin, can be used as the separator 40.

As described above, the laminated electrode body 10 is formed by laminating the plural positive electrode sheets 20, the plural negative electrode sheets 30, and the plural separators 40. More specifically, the laminated electrode body 10 is configured by alternately laminating the positive electrode sheets 20 and the negative electrode sheets 30 via the separators 40 in a lamination direction (the thickness direction Z herein) so as to form plural layers. In addition, the laminated electrode body 10 has a laminated portion where the positive-electrode active material layer 24 and the negative-electrode active material layer 34 overlap each other via the separator 40. This laminated portion is a portion where charge carriers (lithium ions herein) are transferred between the positive-electrode active material layer 24 and the negative-electrode active material layer 34 via the separator 40, and is a portion that contributes to charging/discharging of the single cell 100.

As shown in FIG. 1 to FIG. 7, the laminated electrode body 10 is attached to the electrode terminals 80, 82 that are provided on the battery case 50 (in this example, in the narrow portion 56b of the flat surface 56 of the case body 52). The laminated electrode body 10 is inserted in the case body 52 from the opening portion 52b of the case body 52. The laminated electrode body 10 is accommodated in the battery case 50 in a state where the lamination direction of the electrode body 10 matches the thickness direction Z (a state where the positive electrodes, the negative electrodes, and the separators are in parallel with the sealing plate 54). In addition, in the laminated electrode body 10, the positive-electrode current collection tabs 26 of the plural positive electrode sheets 20, which are repeatedly laminated, are stacked in the lamination direction of the laminated electrode body 10 and are projected from an end surface of the laminated portion. These projected positive-electrode current collection tabs 26 are gathered in the lamination direction. Then, a positive-electrode lead terminal (not shown) is attached to a portion where the positive-electrode current collection tabs 26 are gathered, and is electrically connected to the above-described positive electrode terminal 80. Furthermore, in the laminated electrode body 10, the negative-electrode current collection tabs 36 of the plural negative electrode sheets 30, which are repeatedly laminated, are stacked in the lamination direction of the laminated electrode body 10 and projected from the end surface of the laminated portion. These projected negative-electrode current collection tabs 36 are gathered in the lamination direction. Then, a negative-electrode lead terminal (not shown) is attached to a portion where the negative-electrode current collection tabs 36 are gathered, and is electrically connected to the above-described negative electrode terminal 82. Such a laminated electrode body 10 is accommodated in an almost flat internal space of the case body 52 from the opening portion 52b of the case body 52. After the laminated electrode body 10 is accommodated in the case body 52, the opening portion 52b of the case body 52 is closed by the sealing plate 54.

The electrolyte typically assumes a liquid state at a normal temperature (for example, 25° C.), and is preferred to always assume the liquid state within a use temperature range (for example, −20° C. to 60° C.). A solution that is produced by dissolving or dispersing a supporting electrolyte (for example, lithium salts, sodium salts, magnesium salts, and the like; and lithium salts in the lithium-ion secondary battery) in a nonaqueous solvent can preferably adopted as the electrolyte. As the supporting electrolyte, the supporting electrolyte that is used for the general lithium-ion secondary battery can appropriately be selected and adopted. For example, lithium salts such as $LiPF_6$, $LiBF_4$, $LiClO_4$, $LiAsF_6$, $Li(CF_3SO_2)_2N$, or $LiCF_3SO_3$ can be used. Of these, $LiPF_6$ can preferably be adopted.

As the nonaqueous solvent, any of organic solvents that include various types of carbonates, ethers, esters, nitriles, sulfones, and lactones used for the general lithium-ion secondary battery can be used without any particular limitation. Specific examples of the nonaqueous solvent are ethylene carbonate (EC), propylene carbonate (PC), diethyl carbonate (DEC), dimethyl carbonate (DMC), and ethyl methyl carbonate (EMC).

Figure 8:
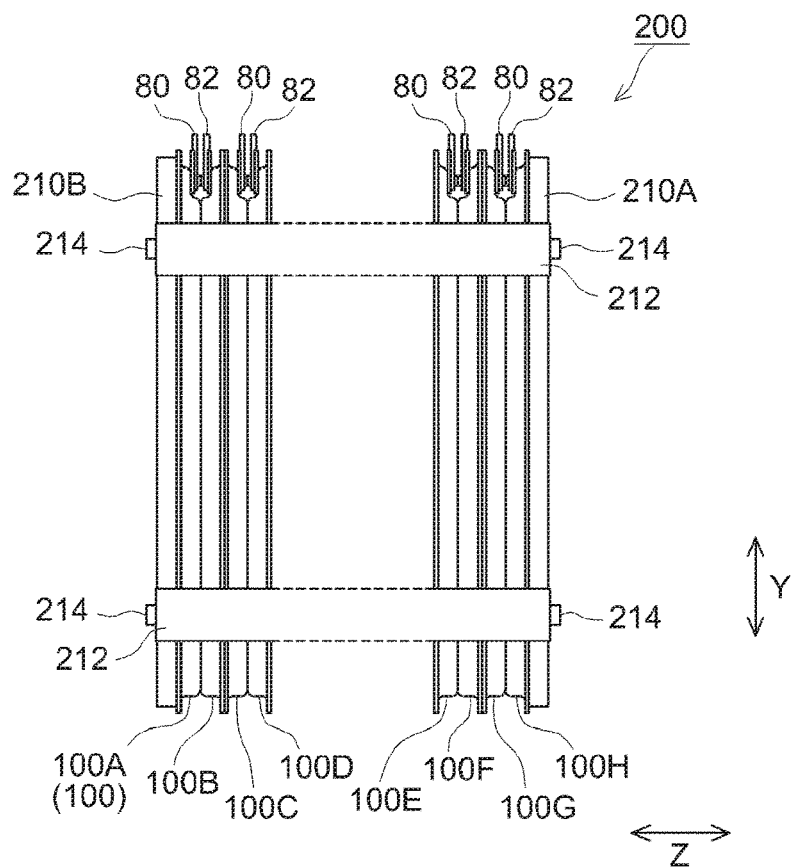
FIG. 8 is a side view, schematically illustrating a battery pack according to the embodiment of the disclosure.

Next, a description will be made on a battery pack 200 according to this embodiment with additional reference to FIG. 8 and FIG. 9. FIG. 8 is a side view of the battery pack 200, and FIG. 9 is a view that illustrates a positional relationship among the gas discharge valves 60 of the single cells 100 in the battery pack 200.

Figure 9:
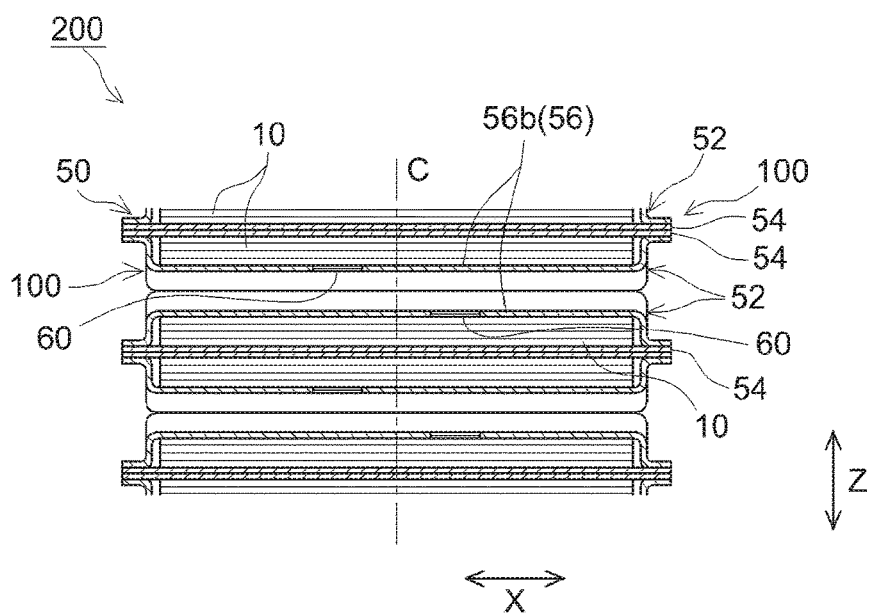
FIG. 9 is a view, illustrating a positional relationship among gas discharge valves of the single cells.

As shown in FIG. 8 and FIG. 9, the battery pack 200 is configured by connecting a plurality (typically 6 or more (for example, 6 to 100), preferably 30 or more, further preferably 50 or more, even more preferably 60 or more) of the single cells 100 in series. In the battery case 50 that is provided in each of the single cells 100, the positive electrode terminal 80, which is electrically connected to the positive electrode 20 of the electrode body 10, and the negative electrode terminal 82, which is electrically connected to the negative electrode 30, are provided. The positive electrode terminal 80 of one of the adjacent single cells 100 is electrically connected to the negative electrode terminal 82 of the other of the adjacent single cells 100 by an inter-terminal connector (not shown). More specifically, the plural single cells 100 are arranged in a state of being reversely directed in an alternate manner such that the positive electrode terminals 80 and the negative electrode terminals 82 of the plural single cells 100 are alternately disposed (the positive electrode terminal 80 of the single cell 100 is disposed next to the negative electrode terminal 82 of the adjacent single cell 100). Thus, the plural single cells 100 are arranged such that the plural single cells 100 are reversely directed in the alternate manner so as to allow the case bodies 52 of the battery cases 50 provided in the single cells 100 oppose each other and to allow the sealing plates 54 of the battery cases 50 provided in the single cells 100 oppose each other.

A restraint member that collectively restrains the plural single cells 100 is disposed around the arranged single cells 100. More specifically, paired end plates 210A, 210B are disposed at both ends of a group of the plural single cells 100 in the arrangement direction Z (on outer sides of single cells 100A, 100H that are located on outermost sides). In addition, a restraint band 212 is attached to the paired end plates 210A, 210B in a manner to run across the paired end plates 210A, 210B. Then, the above group of the single cells 100 is restrained in the arrangement direction by tightening and fixing ends of the restraint band 212 to the paired end plates 210A, 210B by screws 214. In this way, the battery pack 200 can be constructed.

Here, in the above battery pack 200, the plural single cells 100 are arranged such that the plural single cells 100 are reversely directed in the alternate manner so as to allow the case bodies 52 of the battery cases 50 provided in the single cells 100 oppose each other and to allow the sealing plates 54 of the battery cases 50 provided in the single cells 100 oppose each other. Thus, in the two adjacent single cells 100 (in the example of FIG. 8, the single cell 100A and a single cell 100B, a single cell 100C and a single cell 100D, a single cell 100E and a single cell 100F, and a single cell 100G and the single cell 100H), the gas discharge valves 60 are disposed on mutually opposing surfaces of the battery cases 50 (the flat surfaces 56 of the case bodies 52 herein).

As shown in FIG. 2 and FIG. 9, in the battery pack 200 according to this embodiment, the gas discharge valve 60, which is provided in the battery case 50 of each of the single cells 100, is disposed at the position that is offset from the center line C of the battery case 50 in the lateral direction X. More specifically, the length D from the center A of the gas discharge valve 60 to the center line C is greater than the length d from the center A of the gas discharge valve 60 to the outer edge B of the gas discharge valve 60. Just as described, in the cases where the gas discharge valve 60 is disposed at the position that is offset from the center line C of the battery case 50 and the length D from the center A of the gas discharge valve 60 to the center line C is set to be greater than the length d from the center A of the gas discharge valve 60 to the outer edge B of the gas discharge valve 60, in the battery cases 50 that are provided in the two adjacent single cells 100, the gas discharge valves 60 that are provided on the mutually opposing surfaces (the flat surfaces 56 of the case bodies 52 herein) are disposed at positions that do not overlap each other when seen in the arrangement direction Z of the single cells 100.

Figure 10:
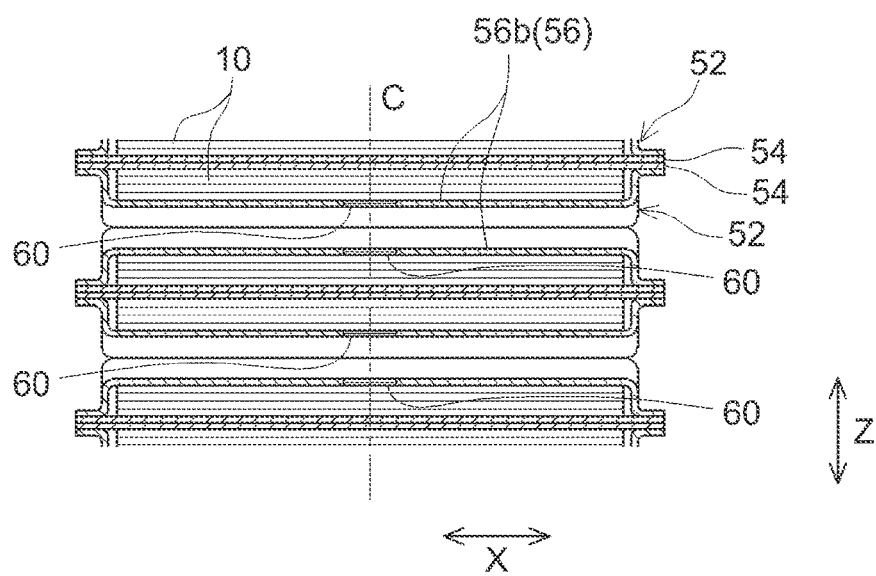
FIG. 10 is a view, illustrating a positional relationship among gas discharge valves of single cells in the related art.
Figure 11:
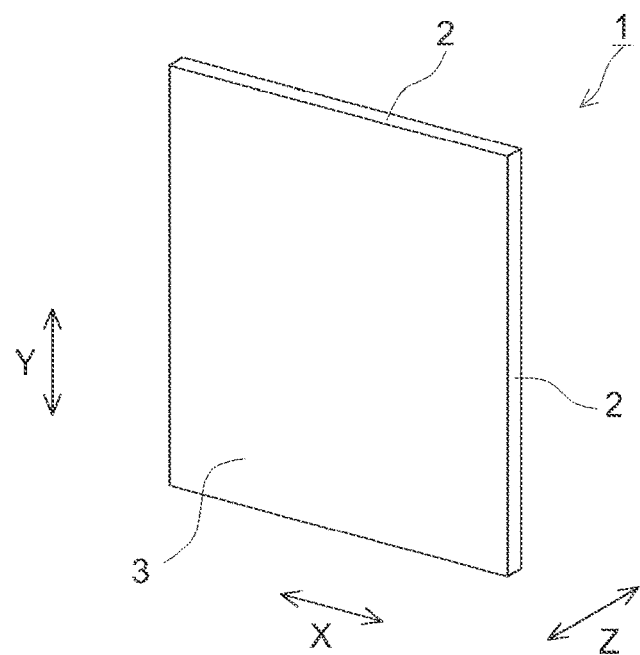
FIG. 11 is a view, illustrating a single cell made low profile.

For this reason, unlike a battery structure in the related art shown in FIG. 10, it is possible to suppress various types of inconvenience that possibly occur when each of the gas discharge valves 60 is provided at a position that overlaps the center line C of the battery case 50 in the lateral direction X (that is, the gas discharge valves 60 that are provided on the mutually opposing surfaces of the battery cases 50 are in turn disposed at positions that overlap each other when seen in the arrangement direction Z). More specifically, when the gas discharge valves 60 are disposed at the positions that oppose each other when seen in the arrangement direction Z, the gas that is discharged from the gas discharge valve 60 of one of the adjacent single cells 100 is blown onto the gas discharge valve 60 of the other of the adjacent single cells 100. In this way, the gas discharge valve 60 of the other of the adjacent single cells 100 possibly suffers from a negative effect. In addition, in the case where both of the gas discharge valves 60 are actuated simultaneously, discharge of the gas from both of the gas discharge valves 60 is mutually inhibited. As a result, there is a possibility that the gas produced in each of the battery cases 50 cannot efficiently be discharged. On the contrary, as described above, in the battery pack 200 according to this embodiment, the gas discharge valves 60, which are provided on the mutually opposing surfaces of the battery cases 50, are disposed at the positions that do not overlap each other when seen in the arrangement direction Z. Thus, the gas that is discharged from the gas discharge valve 60 of one of the adjacent single cells 100 is less likely to be blown onto the gas discharge valve 60 of the other of the adjacent single cells 100. In addition, even in the case where both of the gas discharge valves 60 are actuated simultaneously, the discharge of the gas from both of the gas discharge valves 60 is less likely to be inhibited. Therefore, it is possible to provide the battery pack with this configuration that is less likely to cause the inconvenience as described above and is high in reliability.

According to the above battery pack 200, the case body 52 has: the flat surface 56 on which the electrode body 10 is disposed; and the lateral wall surface 57 that is raised from the flat surface 56 so as to surround the electrode body 10 disposed on the flat surface 56. The flat surface 56 is formed in the step shape that includes: the wide portion 56a on which the electrode body 10 is disposed; and the narrow portion 56b, the distance of which from the sealing plate 54 is shorter than that of the wide portion 56a. The gas discharge valve 60 is provided in this narrow portion 56b of the flat surface 56. In the battery pack 200 with such a configuration, the distance between the sealing plate 54 and the narrow portion 56b of the flat surface 56, in which the gas discharge valve 60 is disposed, is shorter than the distance between the sealing plate 54 and the wide portion 56a. Thus, a certain gap is provided between the narrow portion 56b of the flat surface 56 and the adjacent single cell 100. Just as described, because the certain gap is provided between the narrow portion 56b of the flat surface 56 (in turn, the gas discharge valve 60 that is formed in the narrow portion 56b) and the adjacent single cell 100, the discharge of the gas from the gas discharge valve 60 is less likely to be inhibited by the adjacent single cell 100. Therefore, the further efficient discharge of the gas can be realized.

In the above embodiment, the positive electrode terminal 80 and the negative electrode terminal 82 are disposed line-symmetrically about the center line C of the battery case 50 in the lateral direction X. In addition, the gas discharge valve 60 is disposed at the position that is offset from the center line C of the battery case 50 in the lateral direction X. In this way, when the single cells 100 are arranged in the state of being reversely directed in the alternate manner such that the positive electrode terminals 80 and the negative electrode terminals 82 of the single cells 100 are alternately disposed, the gas discharge valves 60, which are provided on the mutually opposing surfaces of the battery cases 50, are separately disposed in the line-symmetrical manner about the center line C of the battery case 50. Therefore, the gas discharge valves 60, which are provided at the positions not overlapping each other when seen in the arrangement direction, can easily be realized by only using the single cells 100 in the same shape.

In the above embodiment, the battery case 50 has: the concave case body 52, one end of which is opened; and the sealing plate 54 that closes the opening portion 52b of the case body 52. The plural single cells 100 are arranged such that the plural single cells 100 are reversely directed in the alternate manner so as to allow the case bodies 52 of the battery cases 50 provided in the single cells 100 oppose each other and to allow the sealing plates 54 of the battery cases 50 provided in the single cells 100 oppose each other. In this way, for example, even when a worker does not pay special attention to assembly of the single cells 100, each of the single cells 100 can be assembled in a correct direction that is set in advance (that is, a state where the single cells 100 are reversely directed in the alternate manner such that the positive electrode terminal 80 of the single cell 100 is disposed next to the negative electrode terminal 82 of the adjacent single cell 100). Therefore, work efficiency at a time of assembling the battery pack 200 is improved.

According to the above battery pack 200, one of the surfaces of the case body 52, which is provided in each of the single cells 100, in the thickness direction Z is opened. Just as described, the opening portion 52b is provided in the case body 52 in the thickness direction Z. In this way, compared to a case where an opening is provided in the case body 52 in the lateral direction X or the vertical direction Y, the case body 52 can have the large opening. Therefore, even when the single cell 100 is made low profile by thinning the case body 52 in the thickness direction Z, the electrode body 10 can easily be accommodated (inserted) in the battery case 50. In one preferred aspect, each of the single cells 100, which constitutes the battery pack 200, has the smaller dimension in the thickness direction Z than the dimensions in the lateral direction X and the vertical direction Y. In the illustrated example, the dimension of the single cell 100 in the lateral direction X is smaller than the dimension thereof in the vertical direction Y. In addition, the dimension of the single cell 100 in the thickness direction Z is smaller than the dimension thereof in the lateral direction X. For example, the dimension of the single cell 100 in the thickness direction Z can be 1/10 or smaller than 1/10 the dimension thereof in the lateral direction X, and can typically be 1/20 (for example, 1/30 or less than 1/30) the dimension thereof in the lateral direction X. The dimension of the single cell 100 in the thickness direction Z can be set to 1 mm to 20 mm (typically 5 mm to 10 mm), for example. The dimension of the single cell 100 in the lateral direction X can be set to 10 cm to 40 cm (typically 15 cm to 30 cm), for example. Such a single cell 100 that is large and low profile in size does not provide a space where the gas discharge valve 60 is disposed on the lateral surface of the single cell 100. Therefore, application of this configuration yields a high technical value.

The disclosure has been described in detail so far. It should be noted that the above embodiment and examples are merely illustrative and the disclosure disclosed herein includes various modifications and deformations that are made to the above-described specified examples.

For example, in the above embodiment, a case where the gas discharge valve 60 is provided in the case body 52 is exemplified. However, the gas discharge valve 60 is not limited thereto. For example, the gas discharge valve 60 may be formed in the sealing plate 54. In addition, a case where the battery case 50 has: the concave case body 52, the one end of which is opened; and the sealing plate 54 in the flat plate shape that closes the opening portion 52*b* of the case body 52 is exemplified. However, the shape of the sealing plate 54 is not limited to the flat plate shape. For example, the sealing plate 54 may be a concave sealing plate, one end of which is opened. In this case, the battery can be sealed by overlapping an opening of the sealing plate with the opening portion 52*b* of the case body 52 and mutually joining peripheral edge portions thereof.

A preferred object to which the technique disclosed herein is applied is not limited to the above-described electrode body 10 of the laminated type. For example, the preferred object may be a wound electrode body. The wound electrode body includes the positive-electrode current collector 22 and the negative-electrode current collector 32 as strip-shaped sheet materials, the positive-electrode current collector 22 and the negative-electrode current collector 32 are aligned in a longitudinal direction, the positive-electrode active material layer 24 and the negative-electrode active material layer 34 are disposed to oppose each other in a state where the separator 40 is interposed therebetween, and these components are wound about a winding axis. In such a case, the above-described effects can be obtained.

The above battery pack 200 can be used in various applications, and can preferably be used as a power source of (a power supply for driving) a motor that is mounted on a vehicle, for example. Although a type of the vehicle is not particularly limited, automobiles such as a plug-in hybrid vehicle (PHV), a hybrid vehicle (HV), and an electric vehicle (EV) are typically exemplified.

What is claimed is:

1. A battery pack comprising:
   plural chargeable-dischargeable single cells arranged in a specified direction, wherein each of the plural single cells includes:
      an electrode body including a positive electrode and a negative electrode; and
      a box-shaped battery case accommodating the electrode body and an electrolyte,
   wherein the battery case has a flat surface that is a surface perpendicular to a thickness direction of the battery case, and a lateral wall surface that is a surface parallel to the thickness direction and wherein the lateral wall surface extends from the flat surface,
   wherein the battery case has a gas discharge valve formed in the flat surface,
   two adjacent single cells of the plural single cells in the battery pack are provided with gas discharge valves in mutually opposing surfaces of the battery cases, each of the gas discharge valves discharging gas that is produced in the battery case, and
   in the battery cases provided in the two adjacent single cells, the gas discharge valves that are provided in the mutually opposing surfaces are disposed at positions that do not overlap each other when seen in an arrangement direction of the single cells.

2. The battery pack according to claim 1, wherein
   a direction that is a perpendicular direction to a lateral direction and a vertical direction, each of which follows an outer shape of the single cell, is the arrangement direction in which the single cells are arranged in the battery pack, and
   in the lateral direction, each of the gas discharge valve is disposed at a position that is offset from a center line of the battery case.

3. The battery pack according to claim 2, wherein
   in the lateral direction, a length from a center of the gas discharge valve to the center line is greater than a length from the center of the gas discharge valve to an outer edge of the gas discharge valve.

4. The battery pack according to claim 3, wherein
   the length from the center of the gas discharge valve to the center line is 1.5 times or more than the length from the center of the gas discharge valve to the outer edge of the gas discharge valve.

* * * * *